US011720507B2

(12) United States Patent
Kamakura et al.

(10) Patent No.: US 11,720,507 B2
(45) Date of Patent: Aug. 8, 2023

(54) EVENT-LEVEL GRANULAR CONTROL IN AN EVENT BUS USING EVENT-LEVEL POLICIES

(71) Applicant: Amazon Technologies, Inc., Seattle, WA (US)

(72) Inventors: Felipe de Aguiar Kamakura, Vancouver (CA); Rishi Baldawa, Vancouver (CA); Nicholas Smit, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 17/360,924

(22) Filed: Jun. 28, 2021

(65) Prior Publication Data

US 2022/0414039 A1    Dec. 29, 2022

(51) Int. Cl.
*G06F 13/36*    (2006.01)
*G06F 9/54*    (2006.01)

(52) U.S. Cl.
CPC .............. *G06F 13/36* (2013.01); *G06F 9/542* (2013.01)

(58) Field of Classification Search
CPC ................................ G06F 13/36; G06F 9/542
See application file for complete search history.

(56) References Cited

U.S. PATENT DOCUMENTS

| 8,621,037 | B2 | 12/2013 | Li et al. | |
| 9,548,910 | B2 | 1/2017 | Khan | |
| 11,398,943 | B1* | 7/2022 | Baldawa | G06F 12/0891 |
| 2004/0028069 | A1 | 2/2004 | Tindal et al. | |
| 2010/0299466 | A1* | 11/2010 | Asano | H04L 12/40039 710/105 |
| 2015/0269112 | A1* | 9/2015 | Hsueh | G06F 13/4072 710/105 |
| 2016/0062941 | A1* | 3/2016 | Darbari | G06F 11/28 710/105 |

OTHER PUBLICATIONS

International Search Report and Written Opinion dated Sep. 19, 2022 in International Application No. PCT/US2022/073059, Amazon Technologies, Inc., pp. 1-13.
Gabillon, Alban et al: "A Security Model for IoT Networks", Advances in Databases and Information Systems; [Lecture Notes in Computer Science; Lect.Notes Computer], Oct. 27, 2018, pp. 39-56, Springer International Publishing.
Miorandi, Daniele et al: "Sticky Policies: A Survey", IEEE Transactions on Knowledge and Data Engineering, Aug. 20, 2019, vol. 32, No. 12, pp. 2481-2499, IEEE Service Centre, Los Alamitos, CA, US.

* cited by examiner

*Primary Examiner* — Henry Tsai
*Assistant Examiner* — John B Roche
(74) *Attorney, Agent, or Firm* — S. Scott Foster; Kowert, Hood, Munyon, Rankin & Goetzel, P.C.

(57) ABSTRACT

A message-level policy implemented with for a message routing system may be used to mediate between a variety of message sources and message targets that receive and use messages. The message-level policy may allow fine grained message-by-message policy assessment that a message routing system policy may be able to provide. The message-level policy may furthermore interact with the message routing system policy to provide mechanisms to avoid accidental leakage of protected messages or spill-over to protected regions.

20 Claims, 9 Drawing Sheets

EVENT-LEVEL GRANULAR CONTROL IN AN EVENT BUS USING EVENT-LEVEL POLICIES

BACKGROUND

Event-driven architecture (EDA) is a software architecture paradigm which uses events to communicate between decoupled services. Events are changes in states or updates in states of any entities such as microservices of applications. The use of events allows decoupling of applications in that the events are allowed to exist regardless of whether or not interested receiving entities exist. EDA allows highly decoupled applications that may be scaled independently of various microservices of the application. Events in an application using EDA may be sent to an event bus system that mediates events being sent and received across various targets of multiple regions.

Figure 1A:
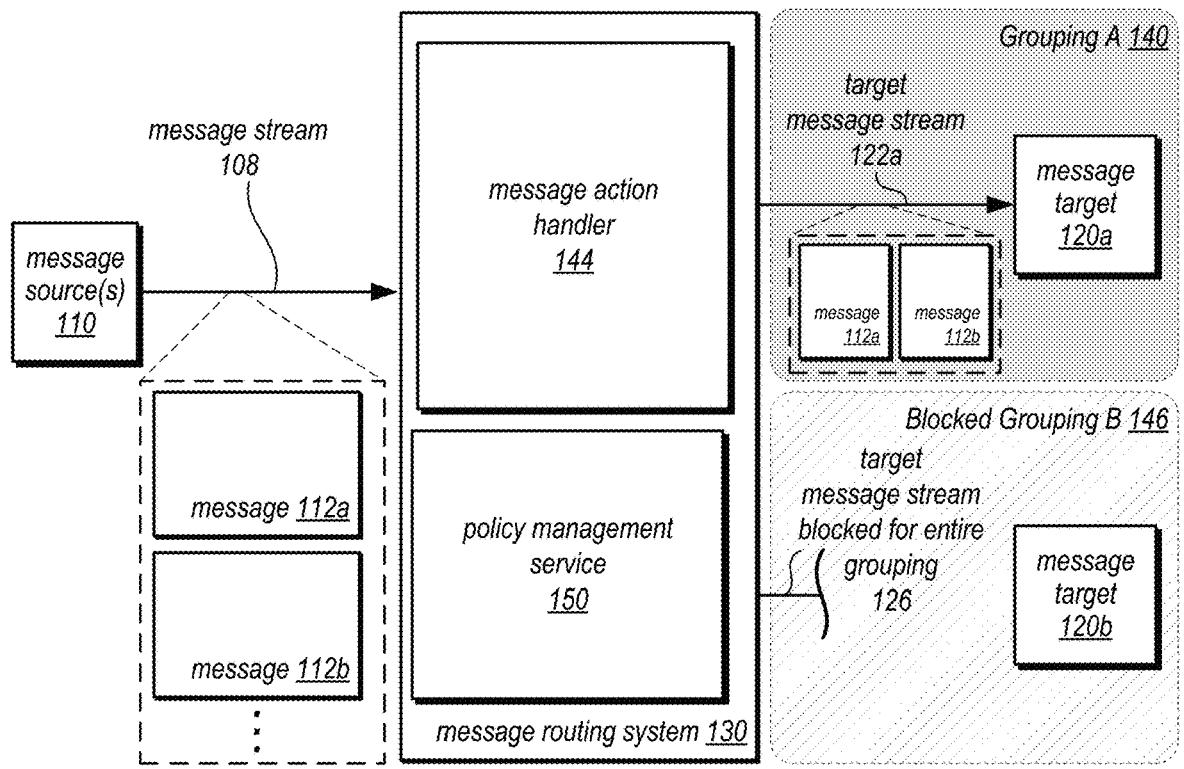
FIGS. 1A-1B are logical block diagrams that illustrate message-level granular control of messages to restrict messages to select groupings using a message routing system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various techniques to enable message-level granular control of messages using a message routing system are described herein. A message routing system may act as a mediator between a variety of message sources and message targets that receive and use messages. One such embodiment of message-level granular control may be event-level granular control of events using an event bus system. An event bus system may act as a mediator between a variety of event sources and event targets that receive and use events. In various embodiments, a message source such as an event source for an event bus system may be various applications such as a Software-as-a-Service (SaaS) application, an internal service application, or an external service application. Similarly, a message target such as an event target may be various applications such as a SaaS application, an internal service application, or an external service application. A message routing system may allow for alleviation of tight coupling between different applications acting as message sources and message targets, resolving problems that may arise as more and more services are added. For example, an event bus system may coordinate the various Application Programming Interfaces (APIs) that are involved in the addition of new services to prevent errors arising from dependencies. Such SaaS applications or other types of applications may utilize an event driven architecture (EDA) to further decouple services of applications built with microservices.

For example, an EDA may be implemented when an event, such as a change in state of any entities (e.g. a microservice), is received or consumed by an event target. In an EDA, events may not be explicitly communicated to the specific recipient—instead, event sources and events may be decoupled to the event targets such that the event producers or event sources need not have knowledge of the identity of the event consumers. Instead of the event sources determining the identity of the event targets, the targets themselves or other similar event consumers may subscribe to receive the events. Furthermore, events may be allowed to exist regardless of whether any interested event recipients or event targets exist downstream, further promoting decoupling. In an EDA, an event bus may be used to help the application mediate the event sources and event targets.

In various embodiments, a message routing system such as an event bus system may be a part of an EDA and may interact with various downstream services by selecting and matching events to event targets, thereby taking on the complexity of ensuring that events are propagated appropriately. Messages such as events may include event data that provides various signals, indications, messages, communications, or other notifications of changes to and/or the state of a system of an event source. An event bus acting as a mediator may allow the consumers and sources to be further decoupled. For example, in order for various services to consume events, instead of updating all of the services involved, the event bus system may be updated to route the events to appropriate services according to rules which may determine how the event bus system handles the event. In this way, event bus systems can be adapted to new services to participate in the sending and receiving of events.

Because of the decoupling of events in an EDA wherein the event sources are not contingent on access to the identity of event targets, an event bus may not be able to apply policies on an event by event basis. The decoupling may occur for messages in general that apply decoupling architecture used for events in an EDA. A message routing system policy, for example an event bus policy, may be used to limit an entire region or groups of regions based on parameters such as geographical location, tags, supergroups, or other groupings of geographical location based on event bus policies.

Furthermore, due to privacy and various regulatory concerns, the traffic of events may be limited to certain regions. In order to facilitate the traffic of events and traffic restrictions to servers of certain regions, an event bus system may be used to mediate events having message-level policies such as event-level policies that are sent and received. Traffic events may be limited to certain regions such as the European Union having General Data Protection Regulation (EU GDPR) where customer data needs to be restricted to regions of origin of the events. A message routing system policy may be used to limit an entire region or groups of regions based on parameters such as geographical location, tags, supergroups, or other groupings of geographical location based on event bus policies.

For example, an event bus using event-level policies may be situated to mediate between multiple groupings such as groupings based on geographical regions. In select systems where multiple regions and communication between multiple regions are allowed, events must be restricted to plan boundaries. Each event in addition to its payload may have event policies which would allow an event bus to control which region origins an event is restricted to. These event-level policies would increase the granularity in which an event may be set. This event bus that incorporates event-level policies would provide mechanisms to avoid accidental leakage of protected events or spill-over to protected regions. This granularity through event-level policies may not be restricted to limiting events to regions but may be applied to other policies such as policies regarding account identity and other parameters. Such event bus services using event-level filters would increase the control and filtering capacity over the events.

Figure 1B:
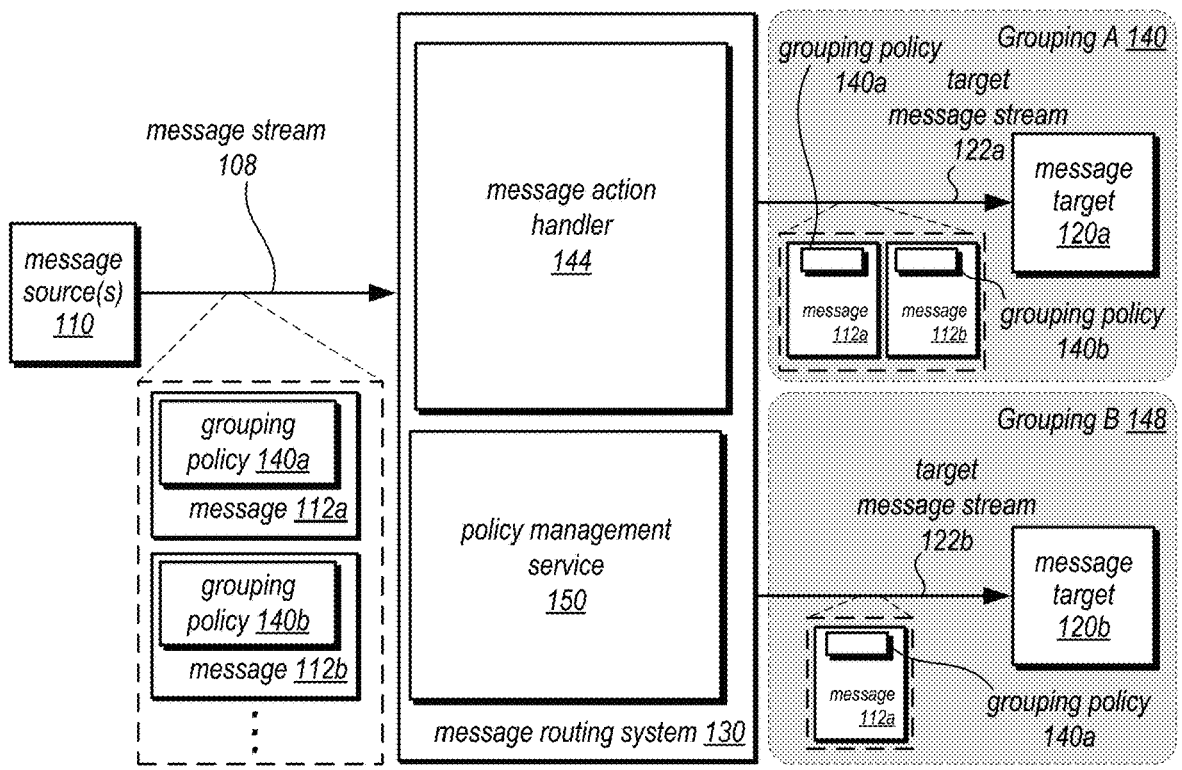

FIGS. 1A and 1B are logical block diagrams that illustrate message-level granular control of messages to restrict messages to select groupings using a message routing system. One or more message sources 110 may generate multiple messages 112*a*, 112*b* and transmit them over a message stream 108. Message 112*a* may be a change in a state of the message source or may be identifiers of the state of the message source. Message routing system 130 may receive messages 112*a*, 112*b* and route the messages to message targets 120*a*, 120*b* across multiple groupings such as Grouping A 140 and Grouping B 146. A message routing system 130 may receive various messages 112*a*, 112*b* send them to various message targets 120*a*, 120*b* through target message stream 122*a*, 122*b*. A message action handler 144 of the message routing system 130 may perform the transmission of messages to various message targets 120*a*, 120*b*. Furthermore, a message action handler 144 may interact with the policy management service 150 to further carry out functions of the message routing system 130 such as the transmission of messages to the message target 120*a*, the storage of dropped messages in a dropped message metric service, etc. service 150 of the message routing system 130. The message targets may be systems, services, or applications such as a Software-as-a-Service (SaaS) applications, an internal service application that can receive message data or streams of message data. Furthermore, the message targets may be a Hypertext Transfer Protocol (HTTP) invocation endpoint using an API destination. Groupings may be geographical groupings, policy-based groupings, etc. The message action handler 144 and the policy management service 150 may be able to implement message bus-level or other system-level policies which may restrict certain behaviors of the message routing system 130 on a coarser scale such as blocking the entire target event stream, as indicated at 126, for the blocked Grouping B 146.

In various embodiments, there may be multiple message sources similar to the message source 110 that may generate messages through various message streams which may transmit them to the message routing system 130. Message routing system 130 may be implemented as part of a provider network, such as the event bus service 210 discussed below, as well as various other systems or applications that may utilize a message routing system separate from systems implementing message sources 110 and message targets 120. The message sources 110 may be systems, services, or applications such as a Software-as-a-Service (SaaS) applications, an internal or external service application that generates message data or streams of message data. A message may refer to each individual message data that may be published or otherwise sent in various data formats such as JavaScript Object Notation (JSON), Binary JSON (BSON), Extensible Markup Language (XML), YAML Ain't Markup Language (YAML), etc. The messages 112*a*, 112*b*, may be an ongoing series of messages to make up target message streams 122*a*, 122*b*, in some embodiments.

In some embodiments the messages 112*a*, 112*b* may have, in addition to its payload, respective grouping policies 140*a*, 140*b* which may provide the message routing system with the ability to utilize the policies to exercise message-level control. A policy management service 150 may manage policies in which the message routing system receives and utilizes the policies to determine on a message-by-message basis actions that the message action handler 144 may take.

For example, based on the grouping policy 140*a* and 140*b*, two messages 112*a* and 112*b* may be allowed to be sent to message target 120*a* in Grouping A 140*a*, only message 112*a* may be sent to message target 120*b* in Grouping B 148 due to restrictions placed in message 112*b* by its message policy 140*b*. In other embodiments the message policy may specify restricted groupings or allowed groupings or a combination of both. The policy management service may furthermore handle conflicts between the message-level policies and the message bus-level policies or other system-level policies according to message routing system configurations such as those described below in FIG. 4.

Please note, FIG. 1 is provided as a logical illustration of the message source, messages, rule management service, filter engine, and message targets is not intended to be limiting as to the physical arrangement, size, or number of components, modules, or devices to implement such features. For instance, there may be more than one message sources and one message grouping/target per grouping that are mediated by the message routing system. There may also be multiple message routing systems employing a similar architecture.

Figure 2:
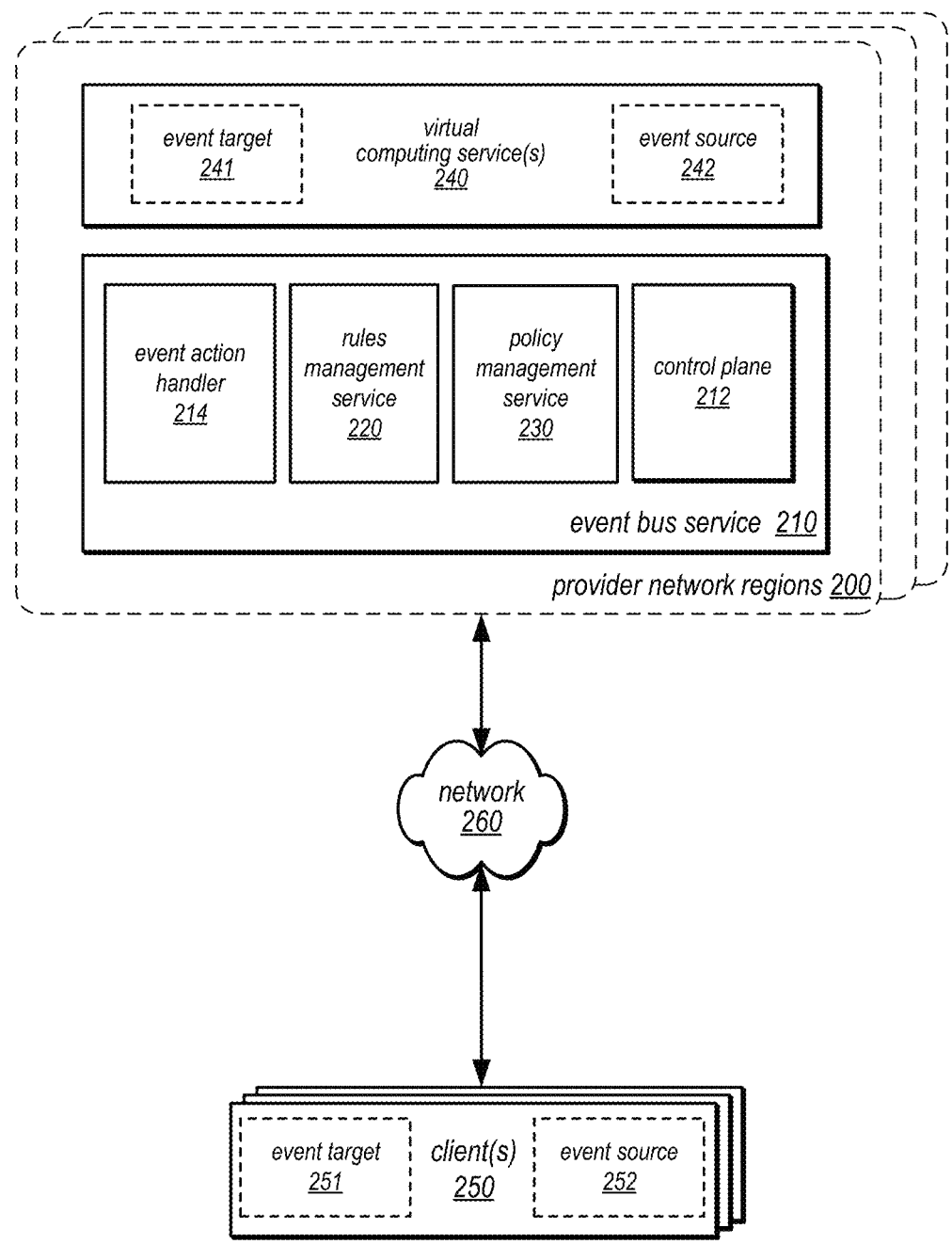
FIG. 2 is a logical block diagram illustrating a provider network that implements an event bus service restricting events to select regions, according to some embodiments.

FIG. 2 is a logical block diagram illustrating a provider network that implements an event bus service restricting events to select regions, according to some embodiments. A provider network may be a private or closed system or may be set up by an entity such as a company or a public sector organization to provide one or more services (such as various types of virtual computing services) accessible via the Internet and/or other networks to clients 250, which may be in one or more regions and may also function as an event target 251 and/or an event source 252. The clients 250 may be located in a single location or implemented over multiple network regions in some embodiments. The provider network also may be implemented in a single location or implemented over multiple network regions 200, that may include one or more data centers hosting various resource pools, such as collections of physical and/or virtualized computer servers, storage devices, networking equipment and the like (e.g., computing system 900 described below with regard to FIG. 9), needed to implement and operate the event bus service 210 (including the rule management service 220 and policy management service 230 within) and one or more virtual computing services 240 and storage services offered by the provider network within the provider network regions 200. The provider network provisions and patches the one or more data centers hosting various resource pools to allow automatic scaling and built-in high availability.

A number of clients 250 may interact with provider network regions 200 via a network 260 across multiple network regions or various geographical groupings, in some embodiments. The client may be an event source 252 wherein the event source generates events to be transmitted to the event bus service 210. The client may likewise be an event target 251 wherein the event source receives events transmitted by the event bus service 210. The event source 252 may generate events with additional event-level policies to give the event bus service granular control, such as the policies to restrict the events to certain regions. Provider network regions 200 may implement an event bus service 210, rules management service 220, policy management service 230, and/or virtual computing services 240 in respective regions. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. Generally speaking, client(s) 250 may encompass any type of clients that can submit network-based services requests to provider network regions 200 via network 260, including requests for event bus services. For example, a given client 250 may include a suitable version of a web browser or may include a plug-in module or other type of code module may execute as an extension to or within an execution environment provided by a web browser. Alternatively, a client 250 may encompass an application such as a database application (or user interface thereof), a media application, an office application or any other application that may make use of the event bus service 210 to send events to make available to the virtual computing services for consumption, receive events from event bus service 210, and/or specify rules for events, in some embodiments. In some embodiments, event bus-level policies (or other system-level policies) may further be made available to the event bus service 210. In some embodiments, such an application may include sufficient protocol support (e.g., for a suitable version of HTTP) for generating and processing network-based services requests without necessarily implementing full browser support for all types of network-based data. That is, client 250 may be an application may interact directly with the event bus service 210 of various provider network regions 200. In some embodiments, client 250 may generate network-based services requests according to a Representational State Transfer (REST)-style web services architecture, a document-based or message-based network-based services architecture, or another suitable network-based services architecture.

Although client(s) 250 are illustrated as external to provider network regions 200, in some embodiments, clients may be implemented with provider network regions 200, such as applications or systems implemented on other virtual computing resources that may make use of event bus service 210 in various regions. In some embodiments, clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, provider network regions 200 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network regions 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based event bus service. It is noted that in some embodiments, clients 250 may communicate with provider network regions 200 using a private network rather than the public Internet. For example, clients 250 may be provisioned within the same enterprise as the event bus service 210. In such a case, clients 250 may communicate with platform regions 200 entirely through a virtual private network 260 (e.g., a LAN or WAN that may use Internet-based communication protocols, but which is not publicly accessible).

Generally speaking, provider network regions 200 may implement one or more service endpoints that may receive and process network-based services requests, such as the receipt of various events and receipt of rules for handling the events. For example, provider network regions 200 may include hardware and/or software may implement a particular endpoint, such that an HTTP-based network-based services request directed to that endpoint is properly received and processed. In one embodiment, provider network regions 200 may be implemented as a server system may receive network-based services requests from clients 250 and to forward them to components of a system that implements event bus service 210, rules management service 220 and/or another policy management service 230 for processing. In other embodiments, provider network regions 200 may be implemented as a number of distinct systems (e.g., in a cluster topology) implementing load balancing and other request management features may dynamically manage large-scale network-based services request processing loads. In various embodiments, provider network regions 200 may be may support REST-style or document-based (e.g., SOAP-based) types of network-based services requests.

In some embodiments, provider network regions 200 may implement various client management features. For example, provider network regions 200 may coordinate the receiving of events from the clients and the various event policies contained therein. Provider network regions 200 may also implement financial accounting and billing systems or may maintain a database of usage data that may be queried and processed by external systems for reporting and billing of client usage activity. In certain embodiments, provider network regions 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments, such metrics may be used by system administrators to tune and maintain system components, while in other embodiments such metrics (or relevant portions of such metrics) may be exposed to clients 250 to enable such clients to monitor their usage of event bus service 210 or virtual computing service(s) 240 (or the underlying systems that implement those services such as the rules management service 220 or policy management service 230). In some embodiments, the one or more virtual computing services 240 may furthermore be an event target 241 or an event source 242. The respective event target 241 of the virtual computing services 240 may interact with the event bus service 210 to receive events from respective event source 252 of clients 250 in various regions as well as from event source 241 in a different provider network region. In other embodiments the respective event source 242 of the virtual computing services 240 may interact with the event bus service 210 to send events to respective event target 251 of clients 250 in various regions as well as to event target 241 in a different provider network region.

In some embodiments, event bus service 210 may route events received from event sources to one or more event targets according to various rules, which may be specified via an interface for event bus service 210. The traffic and operations of event bus service 210 may broadly be subdivided into two categories in various embodiments: control plane operations carried over a logical control plane and data plane operations carried over a logical data plane Event bus service 210 may implement event action handler 214, which may act as a data plane for event bus service 210. For example, while the data plane represents the movement of event data through event bus service 210 to an event target, the control plane 212 represents the movement of control signals through event bus service 210. The control plane generally includes one or more control plane components distributed across and implemented by one or more control servers. Control plane traffic generally includes administrative operations, such as system configuration and management (e.g., resource placement, hardware capacity management, diagnostic monitoring, system state information). Data plane traffic generally includes non-administrative operations such as routing of event data. Certain control plane 212 components (e.g., tier one control plane components such as the control plane for event bus service 210) may be implemented on a separate set of servers from the data plane servers, while other control plane 212 components (e.g., tier two control plane components such as analytics services) may share the virtualized servers with the data plane, and control plane 212 traffic and data plane traffic may be sent over separate/distinct networks.

In some embodiments, event bus service 210 may implement user authentication and access control procedures as part of control plane 212. For example, control plane 212 may determine whether a request is authorized to configure event policy/event bus policy interactions, publish event bus policies, publish events, specify rules, and/or receive events from event bus service 210. The control plane 212 may determine such authorization by, for example, evaluating an identity, password or other credential against credentials associated with a particular event source requesting the event bus service 210 to ingest an event data. For example, if a client 250 does not have sufficient credentials to publish events to the event bus service 210, the proxy node may reject the corresponding network-based services request, for example by returning a response to the requesting client 250 indicating an error condition. Various access control policies may be stored as records or lists of access control information by event bus service 210 and the virtual computing services 240. In some cases, the accounting and/or credentialing services of provider network regions 200 may be unnecessary for internal clients such as administrative clients or between service components within the same enterprise.

Figure 3:
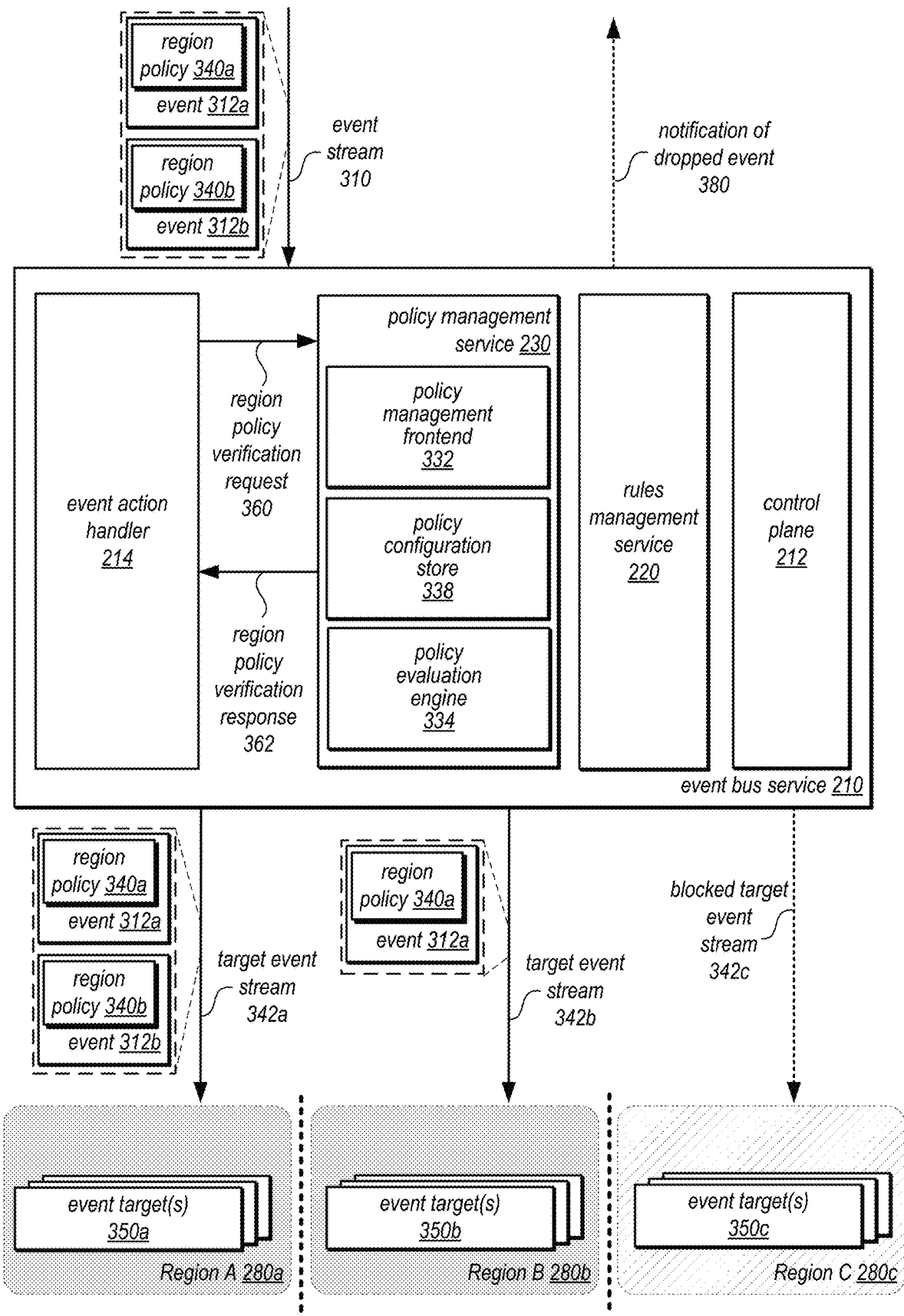
FIG. 3 is a logical block diagram illustrating various components of an event bus service and the policy management service and their interaction with events, according to some embodiments.

FIG. 3 is a logical block diagram illustrating various components of an event bus service and the policy management service and their interaction with events, according to some embodiments.

An event bus service 210 may take in through an event stream 310 one or more events 312a, 312b wherein the events contain event-level region policies 340a, 340b that allows granular control over the event. In some embodiments one or more event targets 350a, 350b, 350c may be located within regions 280a, 280b, 280c. The events 312a, 312b may be sent to one or more event targets 350a, 350b, 350c. The region policy 340a, 340b may be policies at the event-level and may designate allowed regions or restricted regions. In other embodiments, the region policies 340a, 340b may further be policies that describe regions in which the events may be restricted to but may further describe any policies that describe events in general. For example, the event policies may not be limited to policies regarding regions but to policies regarding certain accounts or users.

In this example, event bus service 210 includes event action handler 214, rules management service 220, policy management service 230 and control plane 212. The control plane 212 coordinates the rule management service 220 and the policy management service 230 such that the pieces are able to work in conjunction with one another as well as able to handle various functions of the event bus service 210 such as the control over events. The control plane 212 may also facilitate authentication and access control procedures and may determine whether the event stream 310 or events sources generating the events 312a, 312b are authorized to publish events to the event bus service 210 or is authorized to receive the events 312a, 312b from the event bus service 210.

In some embodiments, the event bus service 210 may receive the event 312a, 312b. Using the policy management service 230, the region policies 340a and 340b may be identified and assessed by the policy management service 230 to take subsequent event action. In some embodiments, the event action handler 214 may request region policy verification 360 to the policy management service 230 in order to take appropriate action to take such as whether to send an event determined to be routed to an event target of a certain region. The policy evaluation engine 334 of the policy management service 230 may evaluate the region policy 340a, 340b and return to the event action handler 214 with a region policy verification response 362. The response may be instructions to allows the events to be sent to event target, such as events 312a, 312b with their respective region policy 340a, 340b to be sent to the event target(s) 350a of Region A 280a, as indicated at target event stream 342a. On the other hand, in some embodiments, based on the region policy verification response 362, the event action handler 214 may disallow the event from being sent to an event target 350b in a region, such as event 312a with the region policy 340a allowed to be sent to Region B 280b, but event 312b with its region policy 340b to be sent to the event target(s) 350b of Region B 280b, as indicated at target event streams 342b.

In some embodiments, the policy management frontend 332 may receive event bus policies which allows the event bus service 210 to determine the routing of events. These event bus policies may be used to determine the behavior of the event bus service at the event bus-level, such as blocking target event stream 342c through an event bus policy of restricting events from being sent to Region C 280c. Event bus-level policies or other such system-level policies may be distinguishable from event-level policies in that the event bus-level policies are not directed at granular control of individual events wherein the events themselves would supply the region allowances or region restrictions. Whether through the entire region blocked through the use of an event bus-level policy or through an event policy, events that were dropped by the event action hander 214 from being delivered, such as event 312a may be given to desired metrics service or the event generator of the dropped event 380. The received event bus policies may be stored inside the policy configuration store.

In some embodiment, rule management service 220 manages the rules in which the event bus system receives and utilizes rules to route events 312a, 312b to event targets 350a, 350b, 350c. The event targets 350a, 350b, 350c results from the event bus applying rules to route the appropriate events to the appropriate event target 120. In various embodiments, rules may be conditions that inform the event bus system how to match incoming events to event targets and route them accordingly (e.g., as discussed in detail below with regard to FIG. 6. A single rule can route an event to multiple targets, in some embodiments. Rules may be specified or sent to the rule management service 220 via an interface for event bus 130 and published in various data formats similar to events such as JSON, BJSON, XML, YAML, etc. Rules may be used by the rule management service 220 to process events in parallel and need not be processed in a particular order. A rule management service 220 may include instructions to modify the event to be sent to by the event bus system to the event targets such as passing certain portions of the event or overwriting certain portions of the event with a predefined value. In some embodiments, event bus service 210 may have multiple layers of policies between the event-level policies 340a, 340b and the event bus-level policies. As discussed in detail below with regard to FIG. 4, The multiple policies and the kinds of policies may be organized through event bus service configurations which may be configured by the account owner or user of the event bus service.

Figure 4:
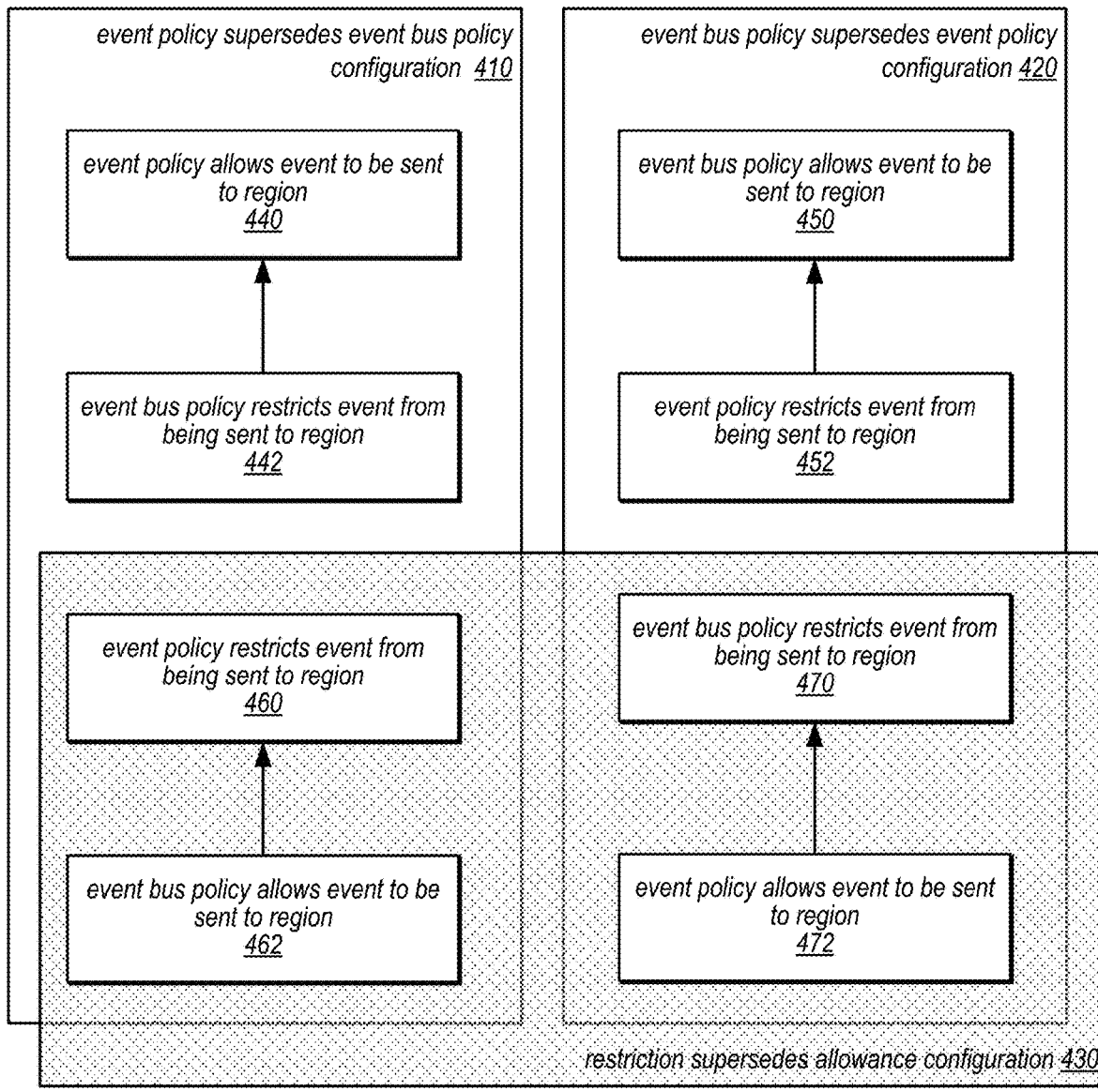
FIG. 4 is a logical block diagram illustrating various configurations of event policy and event bus policy interactions, according to some embodiments.

FIG. 4 is a logical block diagram illustrating various configurations of event policy and event bus policy interactions, according to some embodiments. In an event bus service, there may be multiple policies describing the regions in which the event may be sent or may be restricted, as well as multiple levels of policies such as the granular event-level policies and the broader event bus-level policies (or other system-level policies). In some embodiments, the event bus service may utilize configurations to resolve potential conflicts between the two types of policies.

In some embodiments, the event bus may take on a configuration wherein the event policies would supersede the event bus policies 410. In this configuration when an event bus has stored an event bus policy restricting an event from being sent to a region 442 and an event with an event policy that allows events to be sent to a region 440 arrives, the event bus would send the event to the region per the policy configuration 410. In the situation wherein the event bus policy that allows events to be sent to a region 462 is stored and an event has an event policy which restricts events from being sent to the region 460 is received by the event bus service, the event bus service would not send the event to the region per the event policy favoring policy configuration 410.

In some embodiments, the event bus may take on a configuration wherein the event bus policies would supersede the event policies 420. In this configuration when an event bus has stored an event bus policy allowing an event to be sent to a region 450 and an event with an event policy that restricts events from being sent to the region 452 arrives, the event bus would send the event to the region per the policy configuration 420. In the situation wherein the event bus policy that restricts event from being sent to a region 470 is stored and an event has an event policy allowing events to be sent to the region 472 is received by the event bus service, the event bus service would not send the event to the region per the event bus policy favoring policy configuration 420.

In some embodiments, the event bus may take on a configuration wherein the event policies that are restrictive would supersede the event policies, without favoring event bus policy or event policy 430. In this configuration, when an event bus policy that allows events to be sent to a region 462 is stored and an event has an event policy which restricts events from being sent to the region 460 is received by the event bus service, the event bus service would not send the event to the region per the event policy favoring restrictions 430. In the situation wherein the event bus policy that restricts event from being sent to a region 470 is stored and an event has an event policy allowing events to be sent to the region 472 is received by the event bus service, the event bus service would not send the event to the region per the event bus policy favoring restrictions 430.

The event bus policy configurations may include other aspects of relationship between eh event policy and the event bus policy such as additional actions that the event bus service or components such as the event action handler are to take. In some embodiments, other configurations may exists apart from the three described above such as using different criteria of restriction, such as restriction of a certain region, as well as blend of the configurations described above (i.e. giving preference to the event policy allowing an event to be sent but giving preference to event bus that restricts an event).

Figure 5:
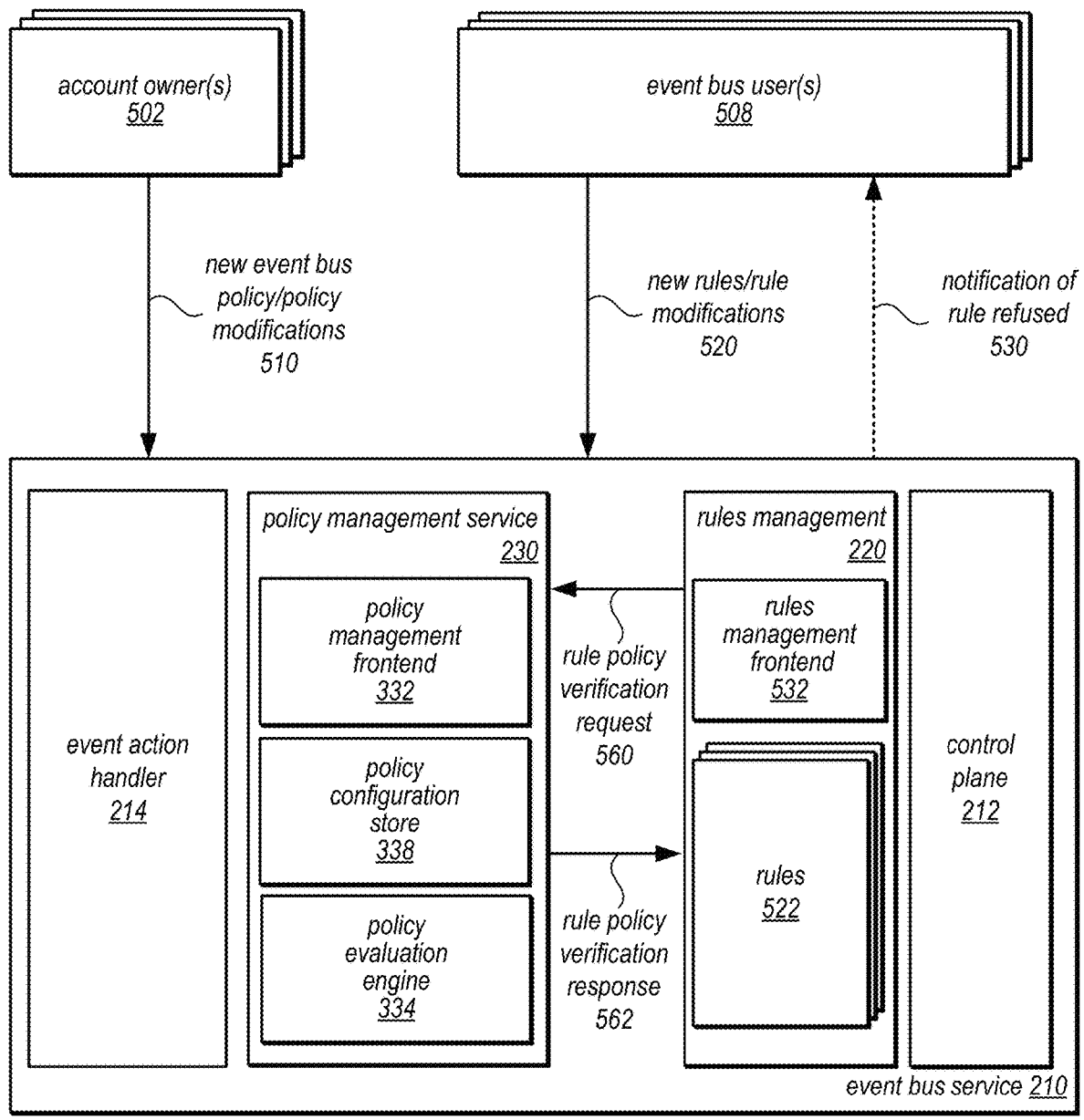
FIG. 5 is a logical block diagram illustrating the interaction between an event bus policy and rules, including rules management, according to some embodiments.

FIG. 5 is a logical block diagram illustrating the interaction between an event bus policy and rules, including rules management, according to some embodiments. In this example, an account owner 502 generates a new event bus policy or modifications to event bus policy 510 and sends it to the event bus service 210. The event bus policy 510 may be in various data formats such as JavaScript JSON, BJSON, XML, YAML, etc. and is stored in the policy configuration store. The account owner 502 may be required to undergo authentication and access control procedures by the control plane 212 to determine whether it is authorized to publish specify a new event bus policy 510 or access the policy configuration store 338 to modify existing policy of the event bus service 210. The control plane 212 may determine such authorization by, for example, evaluating an identity, password or other credential against credentials associated with a particular event source requesting the event bus service 210. Various access control policies may be stored as records or lists of access control information by event bus service 210. Similar authentication and access control procedures may be required by the control plane 212 of event bus users 508 in providing new rules or new rules modification 520 to the event bus service 210. The new rules or modification to rules 520 may be used to determine sending events received by the event bus service 210. The rules management frontend 532 may receive rules/rules modifications 520 which allows the event bus service 210 to determine the matching of events to event targets.

The policy management service 230 may receive a rule policy verification request from the rules management 220 after the receipt of the new rules/rules modifications 520. The rule policy verification request 560 requests from the policy management service 230 whether the new rules/rules modification 520 include as its event target regions disallowed by any event bus policy from being sent to the event target of that region. Rules with event targets or conditions that are additionally excluded by the event bus policy are rejected by the rule management upon receipt of the rule policy verification response 562. The removal of rules that would be excluded from being sent to the event target lessens the load that the rules management would need to perform to determine whether an incoming event matches one of the event targets. In some embodiments the policy management service 220 returns to the event bus users 508 refusal, as indicated at 530, by the rules management 220 to store the new rules 520 in the rules 522.

These event bus policies may be used to determine the behavior of the event bus service at the event bus-level, such as blocking target event stream 342c through an event bus policy of restricting events from being sent to Region C 280c. Event bus-level policies or other such system-level policies may be distinguishable from event-level policies in that the event bus-level policies are not directed at granular control of individual events wherein the events themselves would supply the region allowances or region restrictions. Whether through the entire region blocked through the use of an event bus-level policy or through an event policy, events that were dropped by the event action hander 214 from being delivered, such as event 312a may be given to desired metrics service or the event generator of the dropped event 380. The received event bus policies may be stored inside the policy configuration store.

Figure 6:
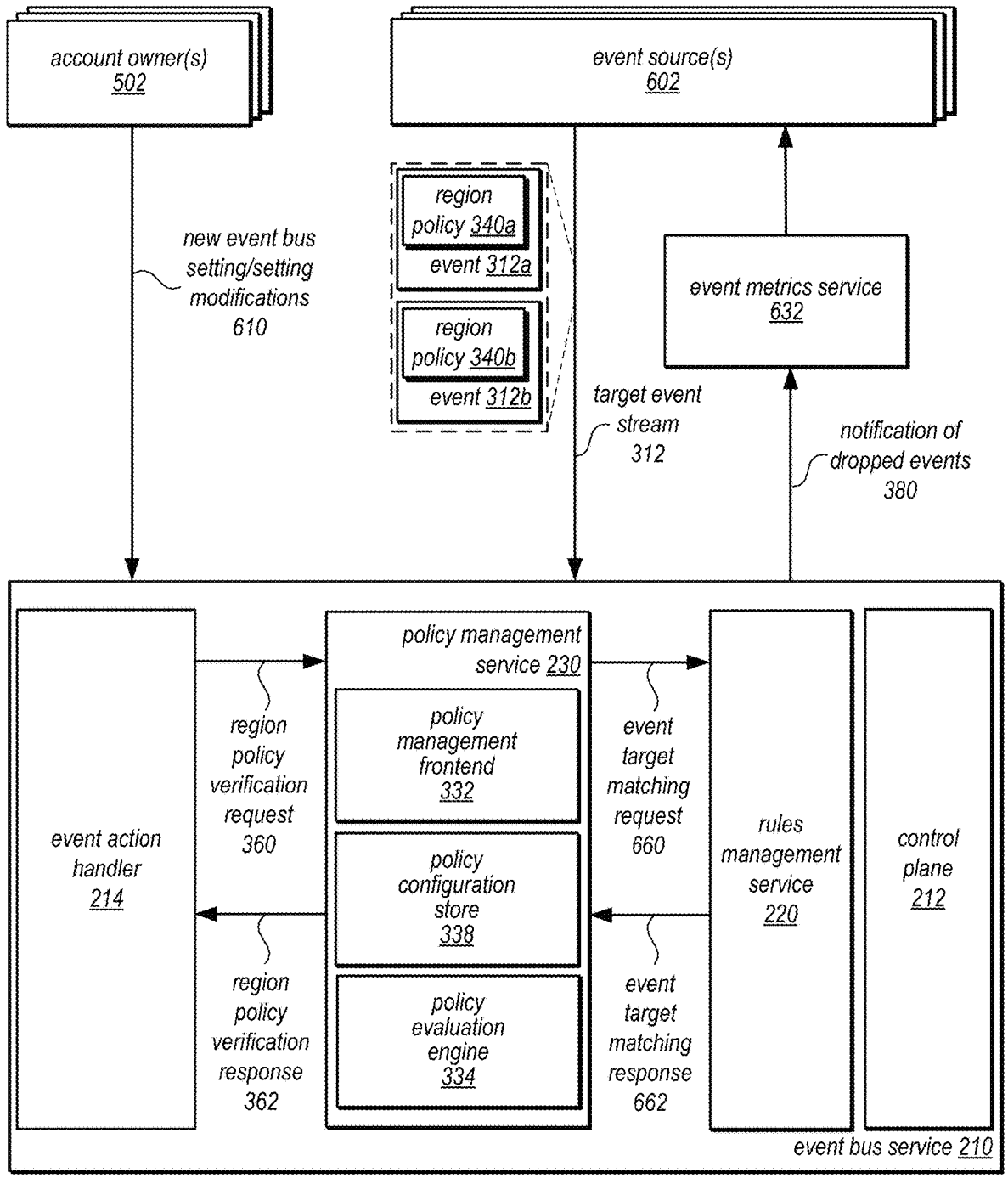
FIG. 6 is a logical block diagram illustrating the interaction between an event policy and events, including event metrics service, according to some embodiments.

FIG. 6 is a logical block diagram illustrating the interaction between an event policy and events, including event metrics service, according to some embodiments. In this example, an account owner 502 generates a new event bus setting or modifications to event bus settings 610 and sends it to the event bus service 210, wherein the setting 610 may include event-level policy/event bus-level policy conflict configurations. The event bus settings 610 may be in various data formats such as JavaScript JSON, BJSON, XML, YAML, etc. and is stored in the policy configuration store. The account owner 502 may be required to undergo authentication and access control procedures by the control plane 212 to determine whether it is authorized to publish specify event bus settings 610 or access the policy configuration store 338 to modify existing policy setting of the event bus service 210. The control plane 212 may determine such authorization by, for example, evaluating an identity, password or other credential against credentials associated with a particular event source requesting the event bus service 210. Various access control policies may be stored as records or lists of access control information by event bus service 210. Similar authentication and access control procedures may be required by the control plane 212 of event sources 602 in establishing target event stream 312 with events 312a 312b having respective region policies 340a, 340b.

Once events 312a, 312b are received by the event bus service 210, the event action handler 214 requests, as indicated at 660, the rules management service 220 to determine whether there are matching event targets based on the rules. The rules may be conditions that inform the event bus system how to match incoming events to event targets and route them accordingly. A single rule can route an event to multiple targets and may be received by the event bus system in various data formats such as JSON, BJSON, XML, YAML, etc. Rules may be used by the rule management service to process events in parallel and need not be processed in a particular order. A rule management service may include instructions to modify the event to be sent to by the event bus system to the event targets such as passing certain portions of the event or overwriting certain portions of the event with a predefined constant. Rules may be defined in variety of ways other than a receipt from event targets such as through a direct user input or pre-defined default rules. The rules management service 220 may respond to the event action handler with the event target matching response 662, including the identities of the targets that the events 312a, 312b are matched with.

The event action handler 214 then requests the policy management service 230 in order to verify that the event target determined in the event target matching response 662 are not limited or restricted by the event policy or the event bus policy. The policy evaluation engine 334 may compare the region policies 340a, 340b with the stored event bus policies and may resolve potential conflicts between the two types of policies according to event-level policy/event bus-level policy conflict configurations of the new event bus settings 610. There may be various interactions and resolutions of conflicts between the event-level policy and the event bus-level policy/system-level policy as described in FIG. 4. The policy management service 230 may respond to the event action handler 214 with the region policy verification request 360 having instructions for the event action handler 214 to resolve the events 312a, 312b accordingly. In some embodiments, the events 312a, 312b may be dropped and not sent to any event targets in which case a notification of dropped events 380 may be sent to the event metrics service 632. The event metrics service 632 may be a separate service or may be a part of the event bus service 210 and may in turn allow the event metrics to be visible to interested entities such as the event sources 612.

Figure 7:
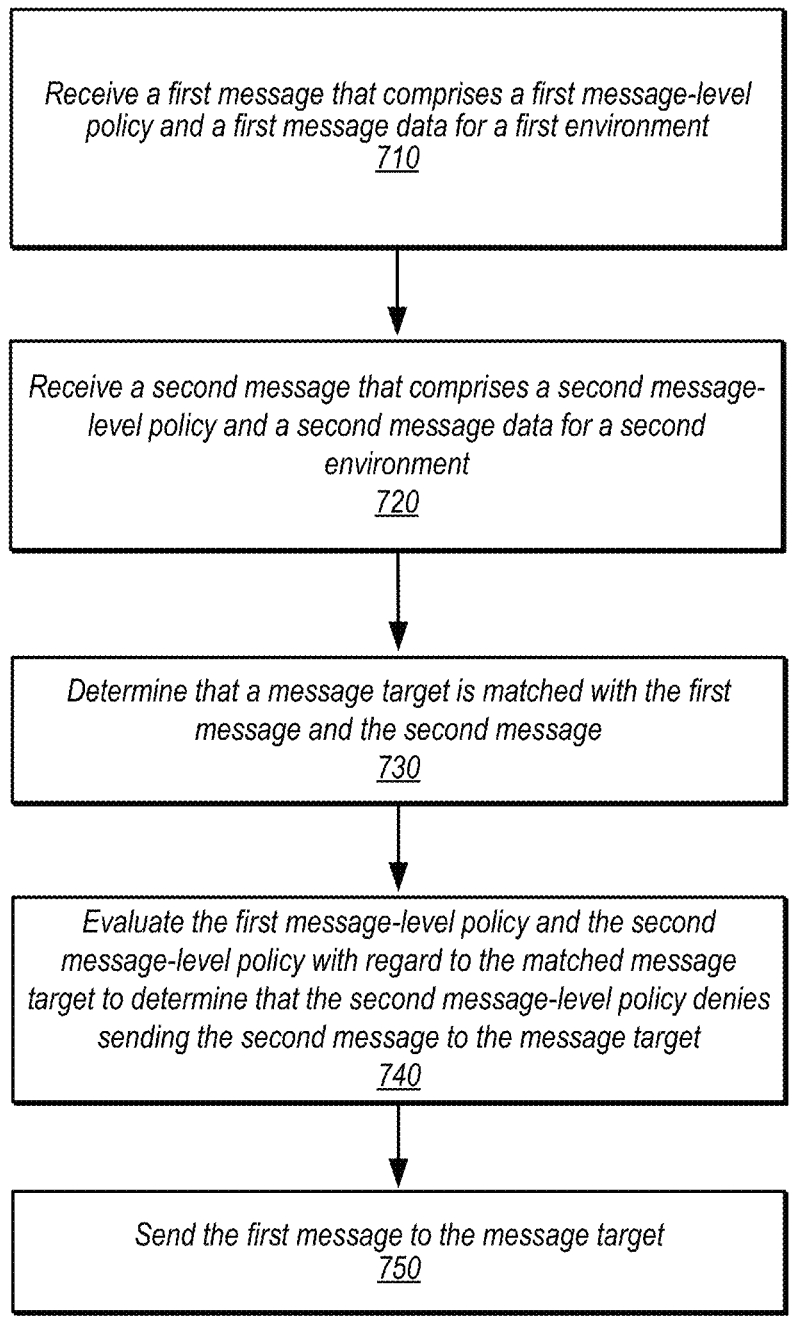
FIG. 7 is a high-level flowchart illustrating various methods and techniques for achieving message-level granular control of messages in a message routing system using message policies, according to some embodiments.

The event bus service 210 discussed in FIGS. 2 through 6 provide examples of a system that illustrates event-level granular control of events to restrict events to select regions using an event routing system. FIG. 7 is a high-level flowchart illustrating various methods and techniques for achieving message-level granular control of messages in a message routing system using message policies, according to some embodiments. Various systems and devices may implement the various methods and techniques described below, either singly or working together. For example, an event routing system may implement the various methods described above. Alternatively, a combination of different systems and devices may implement the various methods. Therefore, the above examples and or any other systems or devices referenced as performing the illustrated method, are not intended to be limiting as to other different components, modules, systems, or configurations of systems and devices.

As indicated at 710, a first message having a first message-level policy and a first message data in a first environment may be received. The message data in the first environment may include changes in the state of the first environment or may be identifiers of the state of the first environment. The first message-level policy may be policy restricting the message. In some embodiments, the message policies may be policies that restrict targets to select geographical regions or groups of geographic regions. In other embodiment, the policies may be policies allowing the messages to be sent to select geographical regions or groups of geographical regions.

As indicated at 720, a second message having a second message-level policy and a first message data in a second environment may be received the message data in the second environment may include changes in the state of the second environment or maybe identifiers of the state of the second environment. The second message-level policy may be policy restricting the message. In some embodiments, the message policies may be policies that restrict targets to select geographical regions or groups of geographic regions. In other embodiment, the policies may be policies allowing the messages to be sent to select geographical regions or groups of geographical regions.

As indicated at 730, a message target may be determined wherein the message target is matched with both the first and second messages. In some embodiments, both of the messages may be matched based on one or more rules that determines the conditions which must be satisfied for the messages to be sent to the message target. Message targets may be systems, services, or applications such as a Software-as-a-Service (SaaS) applications, an internal service application that can receive message data or streams of message data. Furthermore, the message targets may be a Hypertext Transfer Protocol (HTTP) invocation endpoint using an API destination.

As indicated at 740, the first message-level policy and the second message-level policy may be evaluated. The evaluation of the two policies may include evaluations of the restrictions of the message-level policies and/or the allowances of the message-level policies to determine that the second message is excluded from being sent to the message target. In some embodiments the interaction between the message routing bus-level policies or other system-level policies with the message-level policies may be evaluated based on the configuration of the message routing system.

As indicated at 750, the first message may be sent to the message target that was determined to be in the same. Similar to message sources, the API destinations are targets that can be invoked using an HTTP request. The message routing system may invoke an HTTP endpoint wherein the message is sent as a payload within the HTTP request. Various HTTP methods such as GET or POST may be used in the HTTP request.

Figure 8:
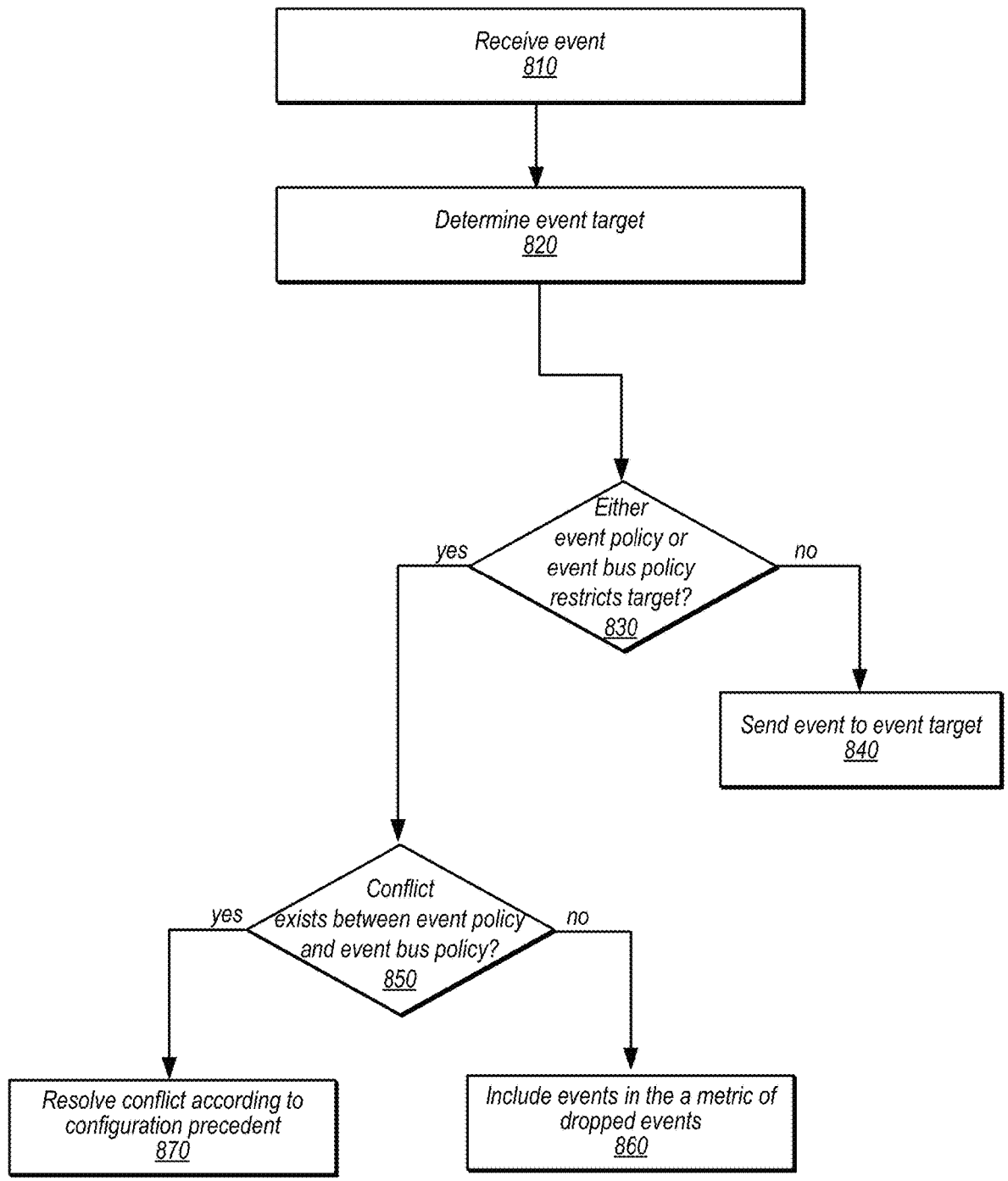
FIG. 8 is a high-level flowchart illustrating various methods and techniques for achieving event-level granular control of events in an event bus with various event policy and event bus policy interactions, according to some embodiments.

FIG. 8 is a high-level flowchart illustrating various methods and techniques for achieving event-level granular control of events in an event bus with various event policy and event bus policy interactions, according to some embodiments. As indicated at 810, an event bus service may receive an event. The event may originate from a variety of systems, services, or applications such as a Software-as-a-Service (SaaS) applications, an internal or external service application that generates event data or streams of event data. As indicated at 820 an event target may be determined. In some embodiments, the event target is matched with both the first and second events based on one or more rules that determines the conditions which must be satisfied for the events to be sent to the event target. Event targets may be systems, services, or applications such as a Software-as-a-Service (SaaS) applications, an internal service application that can receive event data or streams of event data. Furthermore, the event targets may be a Hypertext Transfer Protocol (HTTP) invocation endpoint using an API destination.

As indicated at 830, an evaluation is made whether an event policy or event bus policy restricts the target identified at 820. If neither the event policy nor the event bus policy restricts the target, then the event is sent to the event target at 840. As indicated at 850, a check is made as to whether there is a conflict that exists between the event policy and the event bus policy. Conflicts may be one of the various conflicts as described in FIG. 4 such as a conflict between an event bus policy that allows certain target regions or groups of regions in conflict with an event policy that restricts those target regions. As indicated at 850, if there are no conflicts between an event bus policy and the event policy, the event received at 810 is included in a metric of dropped events 860.

As indicated at 870, if there is a conflict that exists between the event policy and the event bus policy, the conflict is resolved according to precedent set in the event bus configuration. In some embodiments, multiple policy conflicts and multiple types of policy conflicts may be resolved through event bus service configurations. In some embodiments, the conflict may be resolved through sending the event to the event target, dropping the event, and including the dropped event in a metric, or any other action as indicated by the configuration precedent.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
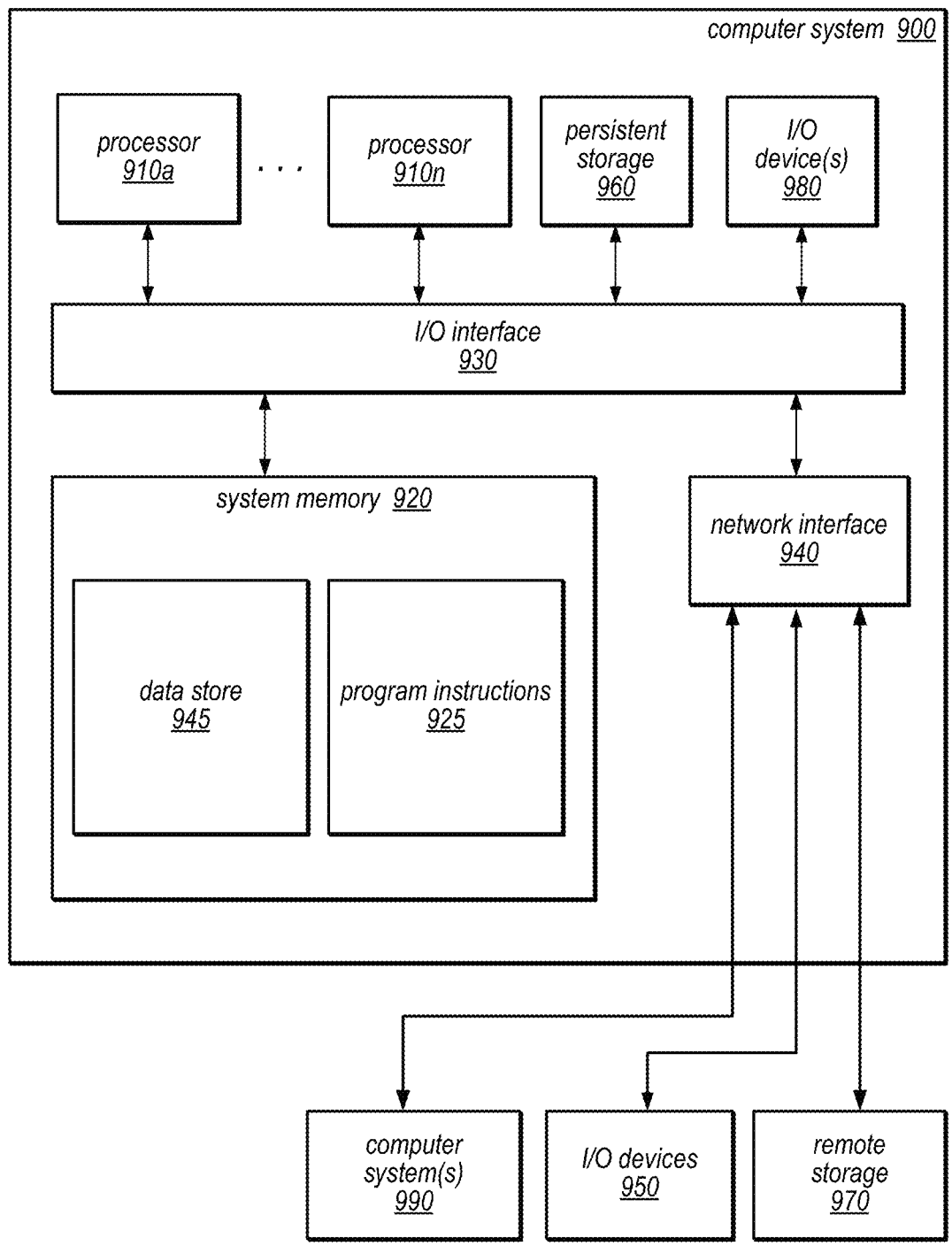
FIG. 9 is a block diagram illustrating an example computer system using an event bus that allows event-level granular control, according to various embodiments.

FIG. 9 is a block diagram illustrating an example computer system using an event bus that allows event-level granular control, according to various embodiments. For example, computer system 900 may implement various features of an event source, event bus system, and/or event target, in various embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910a,n, hereafter referred to as "processor(s) 910" (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement one or more of the components of the event bus systems described herein.

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may host a storage system server node, and persistent storage 960 may include the SSDs attached to that server node.

Computer system 900 includes one or more system memories 920 that may store instructions and data accessible by processor(s) 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in platform native binary, any interpreted language such as Java™ byte-code, or in any other language such as C/C++, Java™, etc., or in any combination thereof.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured as described herein. For example, the information described herein as implementing the rules may be stored in data store 945 or in another portion of system memory 920 on one or more nodes, in persistent storage 960, and/or on one or more remote storage devices 970, at different times and in various embodiments. Similarly, the information described herein as being stored by the storage tier (e.g., events data, rules, and/or probabilistic data structures) may be stored in data store 945 or in another portion of system memory 920 on one or more nodes, in persistent storage 960, and/or on one or more remote storage devices 970, at different times and in various embodiments. In general, system memory 920 (e.g., data store 945 within system memory 920), persistent storage 960, and/or remote storage 970 may store data blocks, replicas of data blocks, metadata associated with data blocks and/or their state, database configuration information, and/or any other information usable in implementing the methods and techniques described herein.

In one embodiment, I/O interface 930 may coordinate I/O traffic between processor 910, system memory 920 and any peripheral devices in the system, including through network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may allow data to be exchanged between computer system 900 and other devices attached to a network, such as other computer systems 990. In addition, network interface 940 may allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 902.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. An event bus system, comprising:
   at least one processor; and
   a memory, storing program instructions that when executed by the at least one processor, cause the at least one processor to:
      receive, at an event bus system, a first event, wherein the first event comprises a first event-level policy and a first event data for a first environment;
      receive, at the event bus system, a second event, wherein the second event comprises a second event-level policy and a second event data for a second environment;
      determine, based on rules in the event bus system, an event target, wherein the rules describe conditions for the event bus system to route events, and wherein the event target is matched with both the first event and the second event according to the rules;
      evaluate the first event-level policy with respect to the event target to determine that the first event-level policy allows sending the first event to the event target;
      evaluate the second event-level policy with respect to the event target to determine that the second event-level policy denies sending the second event to the event target; and
      send the first event to the event target and refrain from sending the second event to the event target.

2. The event bus system of claim 1, wherein the rules are first rules, wherein the event target is a first event target, and wherein the memory stores further instructions that when executed by the at least one processor, cause the at least one processor to:
   receive, at the event bus system, an event bus-level policy, wherein the event bus-level policy indicates a geographical location that the event bus system is to refrain from sending a third event to;
   store the event bus-level policy in a policy configuration store of the event bus system;
   receive, at the event bus system, a request to store a new rule, wherein the new rule describes conditions for the event bus system to route the third event to a second event target within the geographical location, the new rule being specified via an interface for the event bus system; and
   send an indication that the new rule will not be applied in response to a determination that the event bus-level policy denies sending the third event to the second event target.

3. The event bus system of claim 1, wherein the first event-level policy is a policy allowing the event bus system to send the first event to first targets in a first geographical location, and wherein the second event-level policy is a policy allowing the event bus system to send the second event to second targets in a second geographical location, and wherein the event target is not within the second geographical location.

4. The event bus system of claim 1, wherein the event target is a first event target, and wherein the memory stores further instructions that when executed by the at least one processor, cause the at least one processor to:
  receive, at the event bus system, an event bus-level policy, wherein the event bus-level policy indicates a geographical location that the event bus system is to refrain from sending the first event to;
  store the event bus-level policy in a policy configuration store of the event bus system;
  determine, based on the rules in the event bus system, that a second event target within the geographical location is matched with the first event;
  evaluate the first event-level policy with respect to the second event target to determine that the first event-level policy allows sending the first event to the second event target;
  evaluate the event bus-level policy with respect to the second event target to determine that the event bus-level policy denies sending the first event to the second event target; and
  include the first event in a metric of dropped events.

5. A method, comprising:
  receiving, at a message routing system, a first message wherein the first message comprises a first message-level policy and a first message data for a first environment;
  receiving, at the message routing system, a second message wherein the second message comprises a second message-level policy and a second message data for a second environment;
  determining, by the message routing system, that a message target is matched with the first message and the second message;
  evaluating, by the message routing system, the first message-level policy and the second message-level policy with respect to the message target to determine that the second message-level policy denies sending the second message to the message target; and
  sending, by the message routing system, the first message to the message target and refraining from sending the second message to the message target.

6. The method of claim 5, wherein the message target is a first message target, and wherein the method further comprises:
  receiving, at the message routing system, message routing system-level policy, wherein the message routing system-level policy indicates a geographical location that the message routing system is to refrain from sending a third message to;
  storing the message routing system-level policy in a policy configuration store of the message routing system;
  receiving, at the message routing system, a request to store a rule, wherein the rule describes conditions for the message routing system to route the third message to a second message target within the geographical location, the rule being specified via an interface for the message routing system; and
  sending a message communicating that the rule will not be applied in response to a determination that the message routing system-level policy denies sending the third message to the second message target within the geographic location.

7. The method of claim 5, wherein the first message-level policy is a policy allowing the message routing system to send the first message to first targets in a first geographical location, and wherein the second message-level policy is a policy allowing the message routing system to send the second message to second targets in a second geographical location, and wherein the message target is not within the second geographical location.

8. The method of claim 5, wherein targets are first targets, and wherein the method further comprises:
  receiving, at the message routing system, message routing system-level policy, wherein the message routing system-level policy indicates a geographical location that the message routing system is to refrain from sending the first message to;
  storing the message routing system-level policy in a policy configuration store of the message routing system;
  determining, based on rules in the message routing system, that a second message target within the geographical location is matched with the first message, wherein the rules describe conditions for the message routing system to route messages;
  evaluating the first message-level policy with respect to the second message target to determine that the first message-level policy allows sending the first message to the second message target;
  evaluating the message routing system-level policy with respect to the second message target to determine that the message routing system-level policy denies sending the first message to the second message target; and
  including the first message in a metric of dropped messages.

9. The method of claim 5, wherein the first message-level policy indicates the first target in a geographical location that the message routing system is to refrain from sending the first message, and wherein the second message-level policy indicates the second target in a geographical location that the message routing system is to refrain from sending the second message to.

10. The method of claim 5, wherein the message target is a first message target, and wherein the method further comprises:
  receiving, at the message routing system, message routing system-level policy, wherein the message routing system-level policy indicates a geographical location that the message routing system is allowed to send the first message to;
  storing the message routing system-level policy in a policy configuration store of the message routing system;
  determining, based on rules in the message routing system, that a second message target within the geographical location is matched with the first message, wherein the rules describe conditions for the message routing system to route messages;
  evaluating the first message-level policy with respect to the second message target to determine that the first message-level policy denies sending the first message to the second message target;
  evaluating the message routing system-level policy with respect to the second message target to determine that the message routing system-level policy allows sending the first message to the second message target; and including the first message in a metric of dropped messages.

11. The method of claim 5, wherein the message target is a first target, and wherein the method further comprises:
receiving, at the message routing system, message routing system-level policy, wherein the message routing system-level policy indicates a geographical location that the message routing system is allowed to send the first message to;
storing the message routing system-level policy in a policy configuration store of the message routing system;
determining, based on rules in the message routing system, that a second message target within the geographical location is matched with the first message, wherein the rules describe conditions for the message routing system to route messages;
evaluating the first message-level policy with respect to the second message target to determine that the first message-level policy denies sending the first message to the second message target;
evaluating the message routing system-level policy with respect to the second message target to determine that the message routing system-level policy allow sending the first message to the second message target; and
sending the first message to the second message target.

12. The method of claim 5, wherein the message routing system further comprises notifying a message source of the second message of a dropped status of the second message.

13. The method of claim 5, wherein the method further comprises:
receiving, at the message routing system, one or more rules, wherein the rules describe conditions for the message routing system to route messages; and
wherein determining the message target is matched with the first message and the second message is performed according to the rules.

14. The method of claim 5, wherein the first message-level policy and the second message-level policy is a policy disallowing the message routing system from sending the first message and the second message to certain targets in a region according to privacy limitations associated with geographical locations of sources of the first message and the second message.

15. One or more non-transitory, computer-readable storage media, storing program instructions that when executed on or across one or more computing devices cause the one or more computing devices to implement:
receiving, at a message routing system, first message wherein the first message comprises a first message-level policy and a first message data for a first environment;
receiving, at the message routing system, a second message wherein the second message comprises a second message-level policy and a second message data for a second environment;
determining a message target, wherein the message target is matched with both the first message and the second message;
evaluating the first message-level policy to determine that the first message-level policy allows the first message to be sent to the message target;
evaluating the second message-level policy to determine that the second message-level policy denies sending the second message to the message target; and
sending the first message to the message target and refraining from sending the second message to the message target.

16. The one or more non-transitory, computer-readable storage media of claim 15, wherein the message target is a first message target, and the one or more non-transitory, computer-readable storage media store further program instructions that when executed on or across the one or more computing devices, cause the one or more computing devices to further implement:
receiving, at the message routing system, message routing system-level policy, wherein the message routing system-level policy indicates a geographical location that the message routing system is to refrain from sending a third message to;
storing the message routing system-level policy in a policy configuration store of the message routing system;
receiving, at the message routing system, a request to store a new rule, wherein the new rule describes conditions for the message routing system to route the third message to a second message target within the geographical location, the new rule being specified via an interface for the message routing system; and
sending an indication that the new rule will not be applied in response to a determination that the message routing system-level policy deny sending the third message to the message target.

17. The one or more non-transitory, computer-readable storage media of claim 15, wherein the first message-level policy and the second message-level policy is a policy disallowing the message routing system from sending the first message and second message to certain targets in a region according to privacy limitations associated with geographical locations of sources of the first message and second message.

18. The one or more non-transitory, computer-readable storage media of claim 15, storing further instructions that when executed on or across the one or more computing devices, cause the one or more computing devices to implement including the second message in a metric of dropped messages.

19. The one or more non-transitory, computer-readable storage media of claim 15, storing further instructions that when executed on or across the one or more computing devices, cause the one or more computing devices to implement notifying a message source of a dropped status of the second message.

20. The one or more non-transitory, computer-readable storage media of claim 15, storing further instructions that when executed on or across the one or more computing devices, cause the one or more computing devices to further implement:
receiving, at the message routing system, one or more rules, wherein the rules describe conditions for the message routing system to route messages; and
wherein the determining of the message target is performed according to the rules.

* * * * *